United States Patent [19]
Neely

[11] 4,346,689
[45] Aug. 31, 1982

[54] CONTROLLED FUEL INJECTION SYSTEM

[76] Inventor: Noah A. Neely, 9180 E. Placita Violeta, Tucson, Ark.IZONA 85715

[21] Appl. No.: 214,869

[22] Filed: Dec. 9, 1980

[51] Int. Cl.³ ........................ F02B 13/00; F02B 77/04
[52] U.S. Cl. .............................. 123/575; 123/198 A; 123/198 D; 123/1 A
[58] Field of Search ................ 123/1 A, 25 E, 198 A, 123/575, 198 D, 576, 515

[56] References Cited

U.S. PATENT DOCUMENTS

| | | | |
|---|---|---|---|
| 1,611,429 | 12/1926 | Fish | 123/25 E |
| 2,366,830 | 1/1945 | Cannon et al. | 123/575 |
| 2,599,985 | 6/1952 | Fox et al. | 123/575 |
| 3,148,670 | 9/1964 | Fiedler et al. | 123/575 |
| 3,308,794 | 3/1967 | Bailey | 123/575 |
| 3,783,849 | 1/1974 | Bramfitt | 123/576 |
| 3,818,876 | 6/1974 | Voogd | 123/25 E |
| 4,096,839 | 6/1978 | Niertit | 123/575 |
| 4,161,160 | 7/1979 | Hicks et al. | 123/198 A |
| 4,182,278 | 1/1980 | Coakwell | 123/198 A |

Primary Examiner—Charles J. Myhre
Assistant Examiner—E. Rollins Cross
Attorney, Agent, or Firm—Harvey B. Jacobson

[57] ABSTRACT

An improved fuel injection system includes the use of an additive supply which may be selectively injected into the combustion chamber of a vehicle's internal combustion engine through the use of a manually controlled, electrically operated pump. The pump is electrically operated by a switch positioned on the dashboard of the vehicle and serves to transfer the fuel additive from an additive tank to a carburetor or fuel injector system. Further, a bypass line is provided around the conventionally employed fuel filters positioned within the regular fuel line so that fuel may be selectively delivered to the combustion chamber in the event that a fuel filter becomes clogged.

8 Claims, 1 Drawing Figure

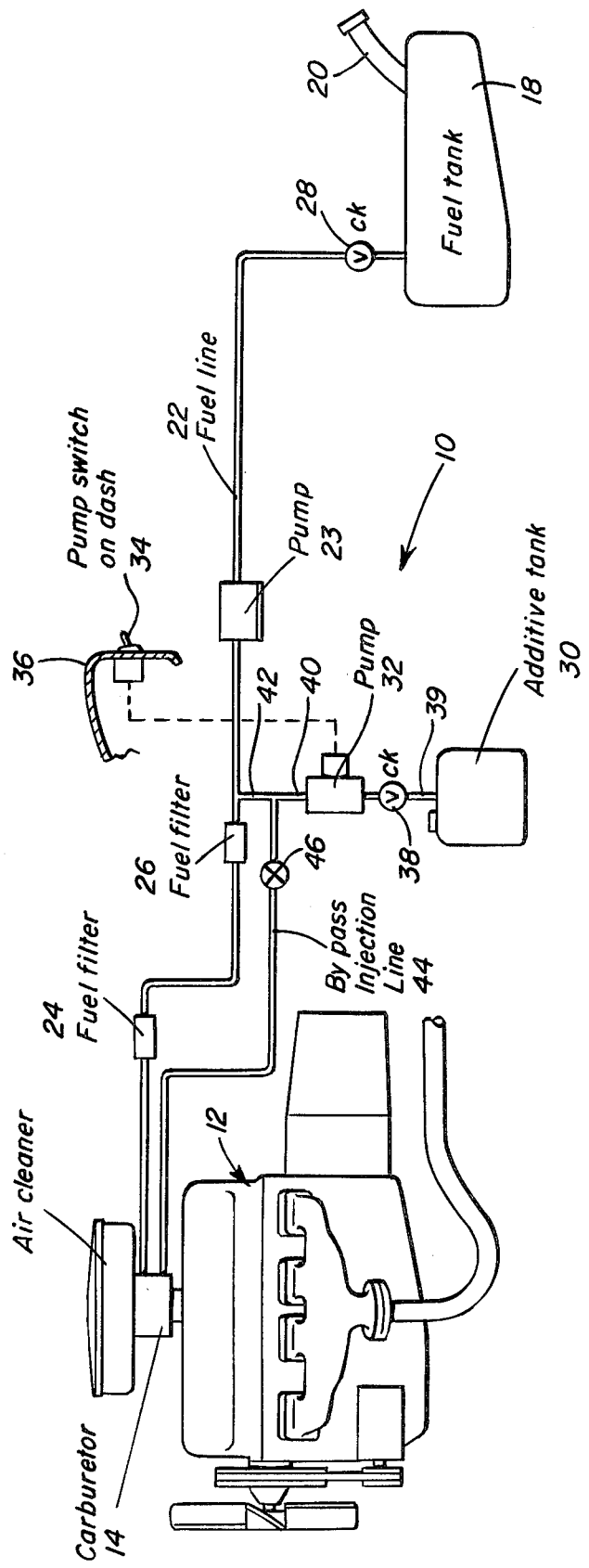

CONTROLLED FUEL INJECTION SYSTEM

BACKGROUND OF THE INVENTION

1. Field of the Invention

The present invention relates generally to internal combustion engines and more particularly pertains to an apparatus for selectively delivering a fuel additive to such an internal combustion engine, as well as providing a means whereby fuel may be bypassed around a clogged fuel filter to the engine.

2. Description of the Prior Art

The concept of delivering fuel additives to an internal combustion engine is generally well-known in the prior art. In this respect, reference is made to U.S. Pat. No. 3,148,670, issued Sept. 15, 1964, to Fiedler et al., wherein an additive fuel is contained in a pressurized container and is selectively delivered to an internal combustion engine fuel line by a manually operable valve located in the passenger compartment of a vehicle. In this regard, the Fiedler et al. device does not make use of an additive supply contained in a tank positioned within the vehicle, but rather relies upon disposable pressurized containers which, as can be appreciated, are expensive and difficult to obtain.

Another arrangement for supplying an additive to an existing engine fuel system is to be found in U.S. Pat. No. 3,308,794, issued Mar. 14, 1967, to Bailey, wherein there is disclosed an engine fuel system which includes a secondary fuel supply contained in a separate tank and deliverable to the combustion chambers of the engine by means of a pump. In this respect, the pump is automatically operated in response to a depression of an accelerator positioned within the passenger compartment of the vehicle. Specifically, if the accelerator is depressed substantially far so as to require additional fuel to be delivered to the engine, the pump cuts in to provide the additional fuel directly to fuel injectors in communication with the combustion chambers. Of course, the Bailey system does not really envision the use of a fuel additive, but rather only increases the supply of fuel delivered to the combustion chambers during times of need. Additionally, the system is not selectively operable since the pump will always cut in if the accelerator is depressed sufficiently far, and no means are provided for continuing deliverance of fuel to the engine in the event of a fuel filter failure.

Similarly, in U.S. Pat. No. 3,783,849, issued Jan. 8, 1974, to Bramfitt, there is illustrated another duel fuel system wherein a separate tank of volatile fuel is provided for selective delivery to the carburetor of an engine when required. In this connection, an appropriate valve switching system has been designed to allow operation of the engine on the volatile fuel during start and warm-up, and then to switch to normal fuel during warmed-up operation. The self-generation system utilizes engine vacuum as an aid in vaporizing a portion of the normal gasoline, and as can be appreciated, no means for manual operation are provided nor are any means provided for continuing engine operation in the event of a fuel filter failure.

Lastly, U.S. Pat. No. 4,096,839, issued June 27, 1978, to Niertit, discloses an internal combustion engine air-fuel ratio control system which utilizes an oxygen sensor to maintain a desired air-fuel ratio at a first location in an intake manifold to an engine combustion chamber. In this connection, a method and apparatus is disclosed for adding fuel or air to the air-fuel mixture at a second location between the first location and the engine combustion chamber, so that the engine operates at a higher efficiency. However, this system also makes no use of a selective manual injection of a fuel additive nor is there any provision for bypassing clogged fuel filters associated therewith.

As such, it can be recognized that there still exists a need for a system which permits selective admission of a fuel additive for cleaning, lubricating or other purposes into an existing fuel line in combination with a means for bypassing fuel filters should they become clogged. The present invention substantially fulfills this need.

SUMMARY OF THE INVENTION

The general purpose of the present invention, which will be described subsequently in greater detail, is to provide a controlled fuel injection system whereby a fuel additive may be selectively injected into the combustion chambers of an internal combustion engine and further where fuel filters may be bypassed in the event they become clogged. To attain this, the present invention provides for a separate tank of fuel additive to be positioned within a vehicle, and the additive contained within the tank is deliverable to the regular fuel line of the internal combustion engine through the use of an electric pump. In this regard, the electric pump is selectively actuated by a manually operable pump switch located on the dashboard of the vehicle, while a check valve is provided between the pump and the additive tank to prevent the regular fuel from flowing into the tank. By the same token, a check valve is positioned within the regular fuel line to prevent the additive from back flowing into the regular fuel tank, and a bypass line is provided from the output of the electric pump directly to the engine carburetor or fuel injectors, so as to bypass fuel filters located in the regular fuel line in the event that the same should become clogged. In this respect, a manually operable valve is located in the bypass injection line so that the same may be shut off or opened as desired.

It is therefore an object of the present invention to provide a controlled fuel injection system which has all the advantages of the prior art controlled fuel injection systems and none of the disadvantages.

It is another object of the present invention to provide a controlled fuel injection system which may be easily and economically manufactured.

It is a further object of the present invention to provide a controlled fuel injection system which is durable and reliable in operation.

It is still another object of the present invention to provide a controlled fuel injection system which is easily adaptable for use in both gasoline and Diesel powered engines.

Yet another object of the present invention is to provide a controlled fuel injection system which allows the selective admission of an additive to the combustion chambers of an internal combustion engine.

Even another object of the present invention is to provide a controlled fuel injection system which permits fuel to be supplied to an internal combustion engine in the event of the fuel filters becoming clogged.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The FIGURE is a schematic diagram of the controlled fuel injection system forming the present invention.

DESCRIPTION OF THE PREFERRED EMBODIMENT

The single FIGURE of the drawing, which illustrates the preferred embodiment of the controlled fuel injection system forming the present invention and as generally designated by the reference numeral 10, shows an internal combustion engine 12 having a carburetor 14 and air cleaner 16 operably positioned thereon. In this respect, it can be appreciated that the controlled fuel injection system 10 forming the present invention can just as readily be employed in use on a Diesel engine, and as such, the internal combustion engine 12 illustrated in the drawing is representative of all fuel powered engines. Further, it can be seen that a fuel tank 18 having a filler pipe 20 is provided, such fuel tank being of the type conventionally supplied with a vehicle containing the internal combustion engine 12 and further containing the regular supply of fuel deliverable to such engine. In this regard, a conventional fuel line 22 is illustrated as extending between the fuel tank 18 and the carburetor 14 whereby fuel may be delivered through the use of a conventional fuel pump 23 to the internal combustion engine 12 so as to power a vehicle or other device associated therewith. Further, the regular fuel line 22 is provided with a pair of fuel filters 24, 26 which are operably employed to clean the fuel being delivered from the fuel tank 18 to the carburetor 14 prior to its combustion within the combustion chambers of the internal combustion engine 12. Additionally, a check valve 28 is positioned in fluid communication with the regular fuel line 22 at a position proximate to the fuel tank 18 whereby a back flow of fuel or other fluids is prevented into the fuel tank.

Also illustrated in the drawing, is an additive tank 30 which, within the scope of the present invention, will be a permanent part of a vehicle or other device containing the internal combustion engine 12, such additive tank having a supply of additive, such as an engine cleaner or lubricant, contained therein and being deliverable to the carburetor 14 by means of an electric pump 32. In this connection, the electric pump 32 is selectively operable through the use of a manually operable pump switch 34, which might be typically positioned on the dashboard 36 of a vehicle containing the internal combustion engine 12. Further, it can be seen that a second check valve 38 is provided in the fluid line 39 between the electric pump 32 and the additive tank 30, whereby a back flow of additive from the electric pump into the additive tank is prevented. By the same token, it can be seen that the outlet conduit 40 coming from the electric pump 32 has one branch 42 in fluid communication with the regular fuel line 22 and has a second branch 44 forming a bypass injection line in direct fluid communication with the carburetor 14. Additionally, a manually operable shutoff valve 46 is provided in the bypass injection line 44 whereby the same may be selectively shut off or opened depending on the desires of the operator.

In use then, it can be seen that the internal combustion engine 12, which may be designed to use either gasoline or Diesel fuel, has such fuel delivered to its fuel injection system or carburetor 14 by a conventional fuel line 22 in fluid communication with a fuel tank 18. During the course of operation of the internal combustion engine 12, it can be appreciated that at times it might be desirable to clean or lubricate parts of the engine, especially with respect to cleaning the fuel filters 24, 26. This is particularly true when using Diesel fuel since the same has a heavy wax content and other by-products which tend to clog fuel lines, especially during cold weather. In this regard, an operator need only to actuate on the pump switch 34 so as to activate the electric pump 32 whereby a supply of additive may be drawn out of the additive tank 30 and delivered to the regular fuel line 22. As can be appreciated, the additive will travel through the respective fuel filters 26, 24, cleaning the same if desired, and being then deliverable into the carburetor or fuel injection system 14. Further, the additive is prevented from running back through the fuel line 22 into the fuel tank 18 by means of the check valve 28 while conversely, the fuel from the fuel line 22 is prevented from running into the additive tank 30 through use of the check valve 38.

During the further course of operation of the present invention, should one or both of the fuel filters 24, 26 become irreparably clogged so as to shut off the fuel supply to the internal combustion engine 12, an operator need only to open the stop valve 46 so as to open the bypass injection line 44. As is apparent, the fuel in the regular fuel line 22 may then travel through the conduit 42 and thence into the bypass injection line 44 for delivery to the carburetor 14. By the same token, this flow of fuel is again prevented from entering the additive tank 30 by means of the check valve 38, and further, if it is desired to still add some additive to the internal combustion engine 12, an operator still can actuate the electric pump 32 whereby the additive may also travel through the bypass injection line 44 to the combustion chambers of the engine.

While a preferred embodiment of the present invention has been described, it is to be understood that the optimum dimensional relationships for the parts of the invention are deemed readily apparent and obvious to one skilled in the art, and all equivalent relationships to those illustrated in the drawings and described in the specification are intended to be encompassed by the invention, subject only to the limitations specifically appearing in the claims.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A controlled fuel injection system comprising:
    a fuel-supplied combustion engine means including a fuel supply storage tank and a fuel line operably connected between said tank and said engine means for delivering said fuel to said engine means;
    an additive supply means including an additive supply storage tank and an additive supply line connected between the additive supply storage tank and fuel line for selectively delivering an additive to said engine means; and bypass means including a bypass injection line connected with the engine means and operatively connected with the fuel line and additive line downstream of the storage tanks for selectively delivering said fuel and said additive to said engine means in the event that a portion of said fuel line, downstream of the additive supply line becomes inoperative.

2. The controlled fuel injection system as defined in claim 1, wherein said additive supply means further includes an electric pump for pumping said additive out of said additive supply storage tank and delivering the same to said fuel line.

3. The controlled fuel injection system as defined in claim 2, wherein said fuel line includes at least one fuel filter, said electric pump delivering said additive through said additive supply line to said fuel line at a position upstream of said fuel filter whereby said additive will flow through said fuel line through said at least one fuel filter to said engine means.

4. The controlled fuel injection system as defined in claim 3, wherein said bypass injection line is connected to the additive supply line between said electric pump and the fuel line whereby said fuel and said additive may be selectively delivered to said engine means in a manner bypassing said at least one fuel filter.

5. The controlled fuel injection system as defined in claim 4, wherein said bypass injection line includes a manually operable stop valve positioned therein whereby said bypass injection line may be selectively shut off or opened as desired.

6. The controlled fuel injection system as defined in claim 5, wherein a pump switch is provided to selectively actuate said electric pump thereby to permit an operator to deliver additive to said engine means as desired.

7. The controlled fuel injection system as defined in claim 6, wherein a first check valve is provided in the fuel supply line between said fuel filter and said fuel supply storage tank and upstream of the additive supply line whereby a back flow of fuel or other fluid is prevented through said fuel line into said fuel tank.

8. The controlled fuel injection system as defined in claim 7, wherein a second check valve is provided between said electric pump and said additive supply storage tank whereby a back flow of additive or other fluid is prevented from going into said additive supply storage tank.

* * * * *